(12) United States Patent
Rajaram et al.

(10) Patent No.: US 10,778,660 B1
(45) Date of Patent: Sep. 15, 2020

(54) MANAGING MULTIPLE PRODUCER CONSUMER—SYSTEMS WITH NON-IDENTICAL IDEMPOTENCY KEYS

(71) Applicant: Amazon Technologies, Inc., Seattle, WA (US)

(72) Inventors: Sasanka Rajaram, Bangalore (IN); Deep Dixit, Kota (IN); Raghunathan Kothandaraman, Redmond, WA (US); Peng Tea, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 313 days.

(21) Appl. No.: 15/272,233

(22) Filed: Sep. 21, 2016

(51) Int. Cl.
*H04L 29/08* (2006.01)
*H04L 29/06* (2006.01)

(52) U.S. Cl.
CPC .......... *H04L 63/061* (2013.01); *H04L 63/123* (2013.01); *H04L 67/327* (2013.01); *H04L 67/42* (2013.01)

(58) Field of Classification Search
CPC ... H04L 63/061; H04L 63/123; H04L 67/327; H04L 67/42
See application file for complete search history.

(56) References Cited

U.S. PATENT DOCUMENTS

| | | | | |
|---|---|---|---|---|
| 6,594,733 B1* | 7/2003 | Cardente | ............ | G06F 12/0817 711/141 |
| 8,219,684 B1* | 7/2012 | Dean | ..................... | G06F 9/5027 709/203 |
| 8,341,722 B2* | 12/2012 | Johnson | ............... | G06F 11/0709 709/239 |
| 8,726,039 B2* | 5/2014 | Amit | ........................ | G09C 1/00 713/189 |
| 8,751,639 B2* | 6/2014 | Griffiths | ............ | G06F 17/30194 709/224 |
| 8,959,222 B2* | 2/2015 | Arrowood | ........... | H04L 67/1002 370/238 |
| 9,436,532 B1* | 9/2016 | Chandrasekaran | ..... | G06F 9/546 |
| 9,563,479 B2* | 2/2017 | Ferris | .................... | G06F 9/5072 |
| 2005/0015471 A1* | 1/2005 | Zhang | ................. | H04L 63/0442 709/221 |
| 2005/0066014 A1* | 3/2005 | Willehadson | ........... | G06F 9/505 709/220 |
| 2008/0107304 A1* | 5/2008 | Coulter | .............. | G06K 9/00369 382/103 |
| 2010/0083273 A1* | 4/2010 | Sihn | ...................... | G06F 9/5016 718/104 |
| 2011/0270941 A1* | 11/2011 | Lee | ......................... | G06F 9/505 709/208 |
| 2015/0365474 A1* | 12/2015 | Matsuda | ........... | G06F 17/30864 709/201 |

(Continued)

*Primary Examiner* — Catherine Thiaw
(74) *Attorney, Agent, or Firm* — Knobbe, Martens, Olson & Bear, LLP

(57) ABSTRACT

Systems and method for incorporating state machine information for tracking processing ownership of messages received by the network service providers. As individual messages are received, the state machine provides any previously tracked ownership state. If the message has not been previously allocated to a specific message processing system, a state can be updated that designates processing ownership. The processing ownership can be allocated based on the allocations among the message processing systems.

19 Claims, 12 Drawing Sheets

(56) References Cited

U.S. PATENT DOCUMENTS

| | | | |
|---|---|---|---|
| 2016/0065660 A1* | 3/2016 | Miyata | H04L 67/1029 709/223 |
| 2016/0170800 A1* | 6/2016 | Di Balsamo | G06F 9/4887 718/104 |
| 2016/0352649 A1* | 12/2016 | Lin | H04L 47/827 |

* cited by examiner

MANAGING MULTIPLE PRODUCER CONSUMER—SYSTEMS WITH NON-IDENTICAL IDEMPOTENCY KEYS

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computing machines to a connected computer user. With virtualization, a single physical computing device can create, maintain, or delete virtual machines in a dynamic manner. In turn, users can request computing resources from a data center and be provided with varying numbers of virtual machine resources on an "as needed" or "as requested" basis. In addition to virtual machines, a data center may provide other computing resources, including hardware computing capacity, data storage space, network bandwidth, and the like. In some environments, a user may request data storage space specifically for use by a virtual machine that the user or another party manages or controls.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
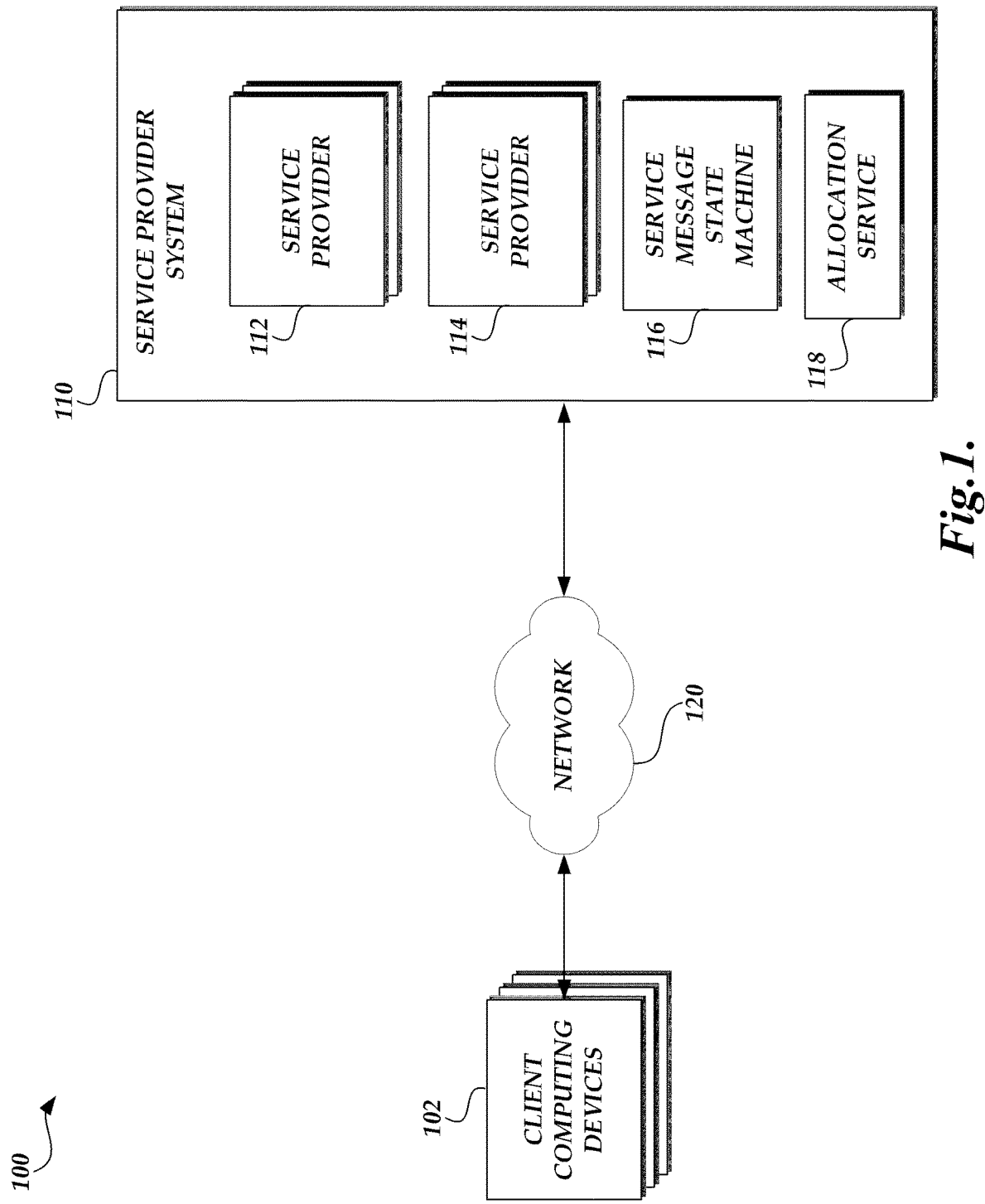
FIG. 1 is a block diagram depicting an illustrative logical network including multiple client computing devices a service provider network.

Generally described, the present application corresponds to management of communication between client devices and network service providers. More specifically, aspects of the present application relate to the utilization of state information that tracks which of a plurality of network service providers will process received service communications from client devices. Illustratively, individual service communications or service commands are accompanied by idempotency keys that correspond to unique identifiers associated with specific client devices. If a duplicative service communication is received from a client device with the same idempotency key, the receiving network service provider can selectively process and mitigate duplicative processing of the redundant service communication.

In accordance with embodiments of the present application, a service provider may utilize a plurality of service providers that are each capable of processing the service communications or service commands. In such embodiments, idempotency keys are unique between client computing devices and individual service providers. Accordingly, duplicate messages/commands received by different service providers could result in duplicative processing of the message/command and obviate the benefit of the idempotency key. By accessing state information tracking processing ownership a plurality of service provider can coordinate and message processing ownership and preserve the benefit of idempotency keys.

With reference to an illustrative example, one or more client computing devices are in communication with a content management system that provides two network service providers. Each network service providers are configured to receive and process client messages or client commands transmitted from the client computing devices. Among the two network service providers, one network service provider is designated as authoritative to designate processing ownership of incoming messages. When a transmitted message is received by the authoritative network service provider, the state machine is queried to determine one of three possible states: 1) no ownership designation or unassigned; 2) assigned to the authoritative network service provider; or 3) assigned to the second network service provider. If the message state is designated as no ownership designation or unassigned, the authoritative network service provider designates processing ownership based on an allocation of processing, such as a percentage of request processed between the authoritative and second network service provider. The authoritative service provider can then update the state machine with the designation. If the state machine query is returned in either the second or third state, the authoritative network service provider will process the message if it has previously assigned ownership to itself or ignore if the processing ownership has been designated for the second service provider. By preserving the previous designation of ownership, idempotency key values can be preserved.

With continued reference to the illustrative example, when the transmitted message is received by the second network service provider, the state machine is also queried to determine one of three possible states: 1) no ownership designation or unassigned; 2) assigned to the authoritative network service provider; or 3) assigned to the second network service provider. If the message state is designated as no ownership designation or unassigned, the second network service provider does not designate processing ownership. Illustratively, the second network service provider will idle the message processing pending a designation of ownership by the authoritative network service provider based on receipt of the same message, as described above, or based on a request transmitted to the authoritative network service provider. If the state machine query is returned in either the second or third state, the authoritative network service provider will process the message if it has previously assigned ownership to itself or ignore if the processing ownership has been designated for the second service provider.

Although aspects of some embodiments described in the disclosure will focus, for the purpose of illustration, on the processing of specific types of service requests, one skilled in the relevant art will appreciate that the examples are illustrative only and are not intended to be limiting. Additionally, although aspects of the present application will be illustrated with regard to two network service providers, one skilled in the relevant art will further appreciate that the present application is not necessarily limited to a particular number of network service providers.

FIG. 1 is a block diagram depicting an illustrative logical network 100 including multiple client computing devices 102 and a service provider network 110 in communication via a network 120. While the client computing devices 102 are shown as a group within FIG. 1, the client computing devices 102 may be geographically distant, and independently owned or operated. For example, the client computing devices 102 could represent a multitude of users in various global, continental, or regional locations accessing the service provider system 110. Accordingly, the groupings of client computing devices 102 within FIG. 1 is intended to represent a logical, rather than physical, grouping. Similarly, while one set of illustrative components is shown to represent the service provider system 110, multiple instances of each component may be present within the content management system 110, and such components may be located within geographically diverse areas (e.g., globally, continentally, or regionally), in order to provide a wide geographical presence for the content management system 110.

Network 120 may be any wired network, wireless network, or combination thereof. In addition, the network 120 may be a personal area network, local area network, wide area network, cable network, satellite network, cellular telephone network, or combination thereof. In the example environment of FIG. 1, network 120 is a global area network (GAN), such as the Internet. Protocols and components for communicating via the other aforementioned types of communication networks are well known to those skilled in the art of computer communications and thus, need not be described in more detail herein. While each of the client computing devices 102 and the service provider system 110 is depicted as having a single connection to the network 130, individual components of the client computing devices 102 and service provider system 110 may be connected to the network 120 at disparate points.

Client computing devices 102 may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may include one or more data stores (not shown in FIG. 1) including various applications or computer-executable instructions, such as web browsers, used to implement the embodiments disclosed herein.

In accordance with embodiments, the service provider system 110 includes two or more network service providers, illustrated in FIG. 1 as network service 112 and network service 114 that provide network services to the client. As described in further detail below, the network services 112 and 114 can each receive requests/messages/commands from client computing devices 102. Each of the network services 112 and 114 can process the request and if appropriate, provide a processing result. For purposes of illustrative example, network service 112 will be designated as the first network service provider (first network service) and can also be referred to as the authoritative service provider. Illustrative components of the first service provider 112 will be described with regard to FIG. 2. In a similar manner, network service 114 will be designated as the second network service provider (second network service) and can also be referred to as the non-authoritative network service provider. Illustrative components of the second service provider 114 will be described with regard to FIG. 3. Additionally, as will be explained in greater detail below, the intermediary servers 114 can further a server message state machine 116 that tracks message processing ownership and provides the tracked state to the plurality of network service providers. In still further embodiments, the service provider system 110 can include an allocation service 118 that corresponds to a stand-alone service for determining processing ownership or an allocation of a message among the network services 112 and 114. One skilled in the relevant art will appreciate that reference to a service provider can correspond to the function of providing the network service and does not necessarily imply that the network service provider is a separate entity from the service provider system 110.

It will be appreciated by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the first network service 112 and second network service 114, may be executed by one more virtual machines implemented in a hosted computing environment. Additionally, the service provider system 110 can include additional network services for processing client requests. A hosted computing environment may include one or more rapidly provisioned and released computing resources, which computing resources may include computing, networking or storage devices.

Figure 2:
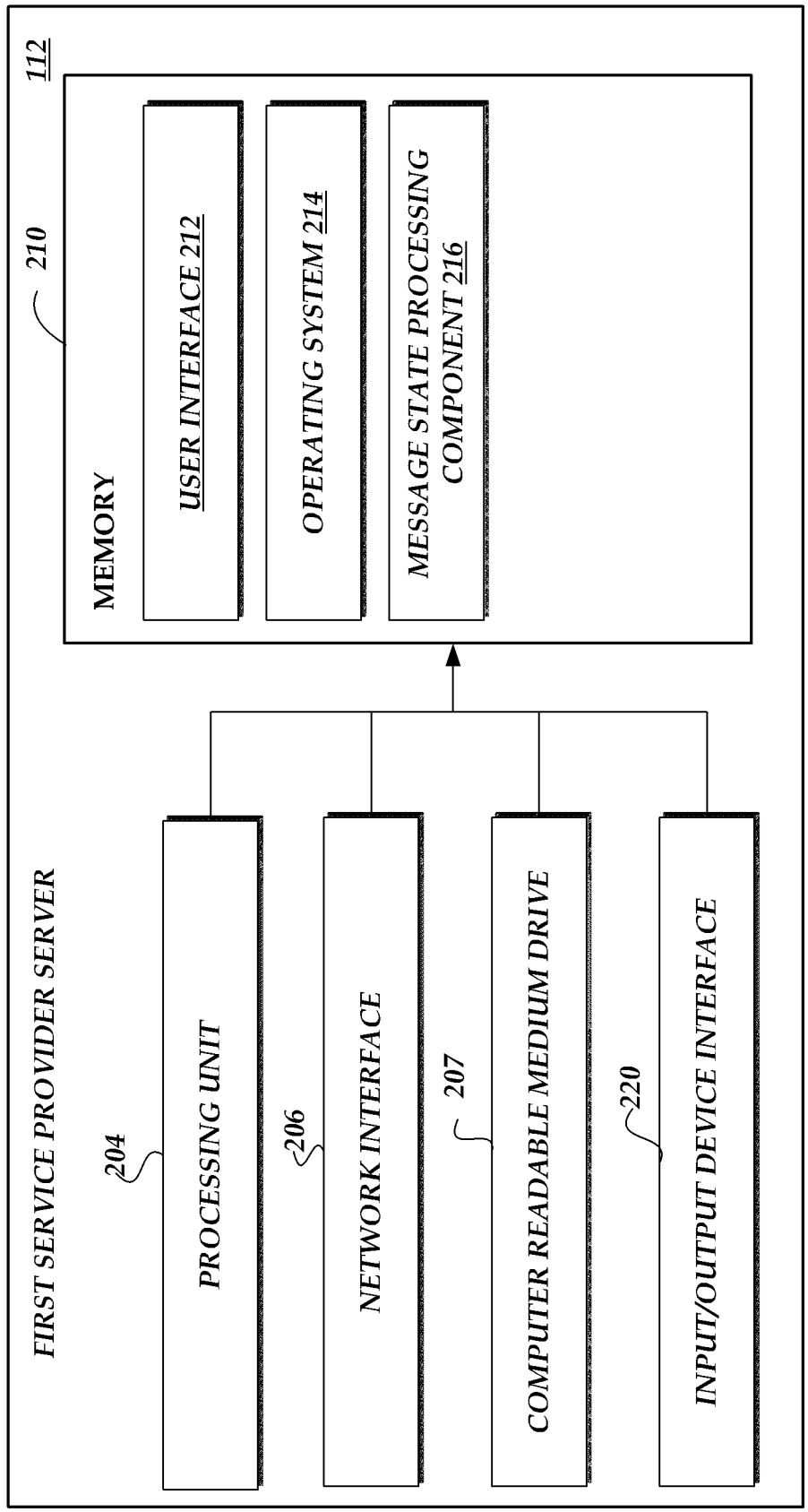
FIG. 2 is a block diagram of illustrative components of a first network service provider server in accordance with the present application.

FIG. 2 depicts one embodiment of an architecture of an illustrative architecture for a computing device functioning as the first network service 112 that can receive and process messages and commands transmitted by client computing devices 102 in accordance with the present application. The general architecture of the first network service 112 depicted in FIG. 2 includes an arrangement of computer hardware and software components that may be used to implement aspects of the present disclosure. As illustrated, the first network service 112 includes a processing unit 204, a network interface 206, a computer readable medium drive 207, an input/output device interface 220, an optional display 202, and an input device 224, all of which may communicate with one another by way of a communication bus.

The network interface 206 may provide connectivity to one or more networks or computing systems, such as the network 120 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the client 102 may include more (or fewer) components than those shown in FIG. 2. For example, some embodiments of the first network service 112 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the client 102. The memory 210 may further include computer program instructions and other information for implementing aspects of the present disclosure. For example, in one embodiment, the memory 210 includes an interface application 212 for receiving messages from client computing devices 102. The memory 210 may further include a message state processing component 216 for processing state information associated with received messages and allocating previously unallocated message processing ownership.

Figure 3:
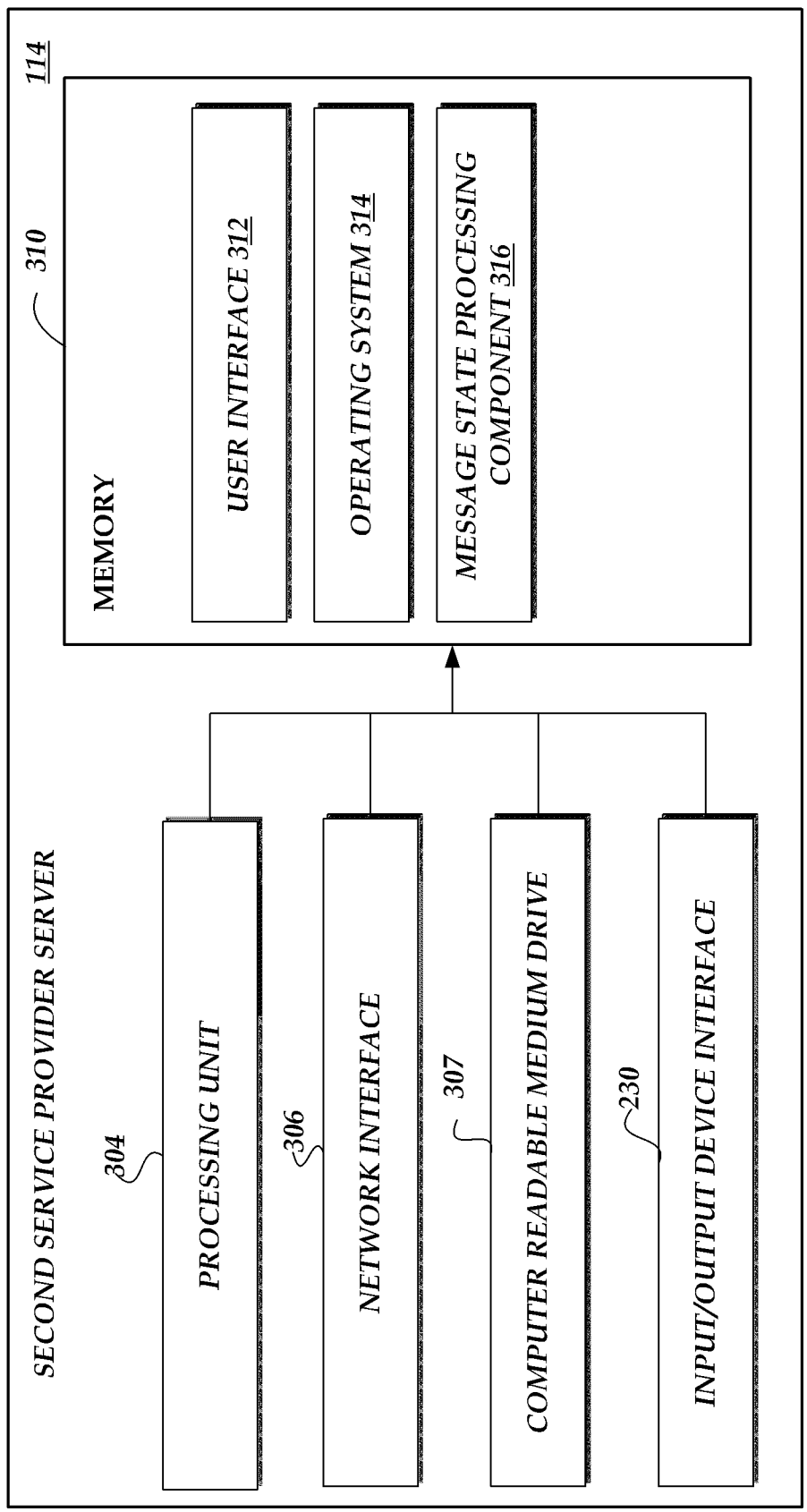
FIG. 3 is a block diagram of illustrative components of a second network service provider server in accordance with the present application.

FIG. 3 depicts one embodiment of an architecture of an illustrative architecture for a computing device functioning as the second network service 114 component that can receive and process messages and commands transmitted by client computing devices 102 in accordance with the present application described herein. The general architecture of the second network service 114 depicted in FIG. 3 includes an arrangement of computer hardware and software components that may be used to implement aspects of the present disclosure. As illustrated, the intermediary server 114 includes a processing unit 304, a network interface 306, a computer readable medium drive 307, an input/output device interface 320, an optional display 302, and an input device 324, all of which may communicate with one another by way of a communication bus. The components of the second network service 114 may be physical hardware components or implemented in a virtualized environment.

The network interface 306 may provide connectivity to one or more networks or computing systems, such as the network 120 of FIG. 1. The processing unit 304 may thus receive information and instructions from other computing systems or services via a network. The processing unit 304 may also communicate to and from memory 310 and further provide output information for an optional display 302 via the input/output device interface 320. The input/output device interface 320 may also accept input from the optional input device 324, such as a keyboard, mouse, digital pen, etc. In some embodiments, the intermediary server 114 may include more (or fewer) components than those shown in FIG. 3. For example, some embodiments of the second network service 114 may omit the display 302 and input device 224, while providing input/output capabilities through one or more alternative communication channel (e.g., via the network interface 306).

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the second network service provider server 114. The memory 310 may further include computer program instructions and other information for implementing aspects of the present disclosure. For example, in one embodiment, the memory 310 includes an interface application 212 for receiving messages from client computing devices 102. The memory 310 may further include a message state processing component 216 for processing state information associated with received messages.

Figure 5:
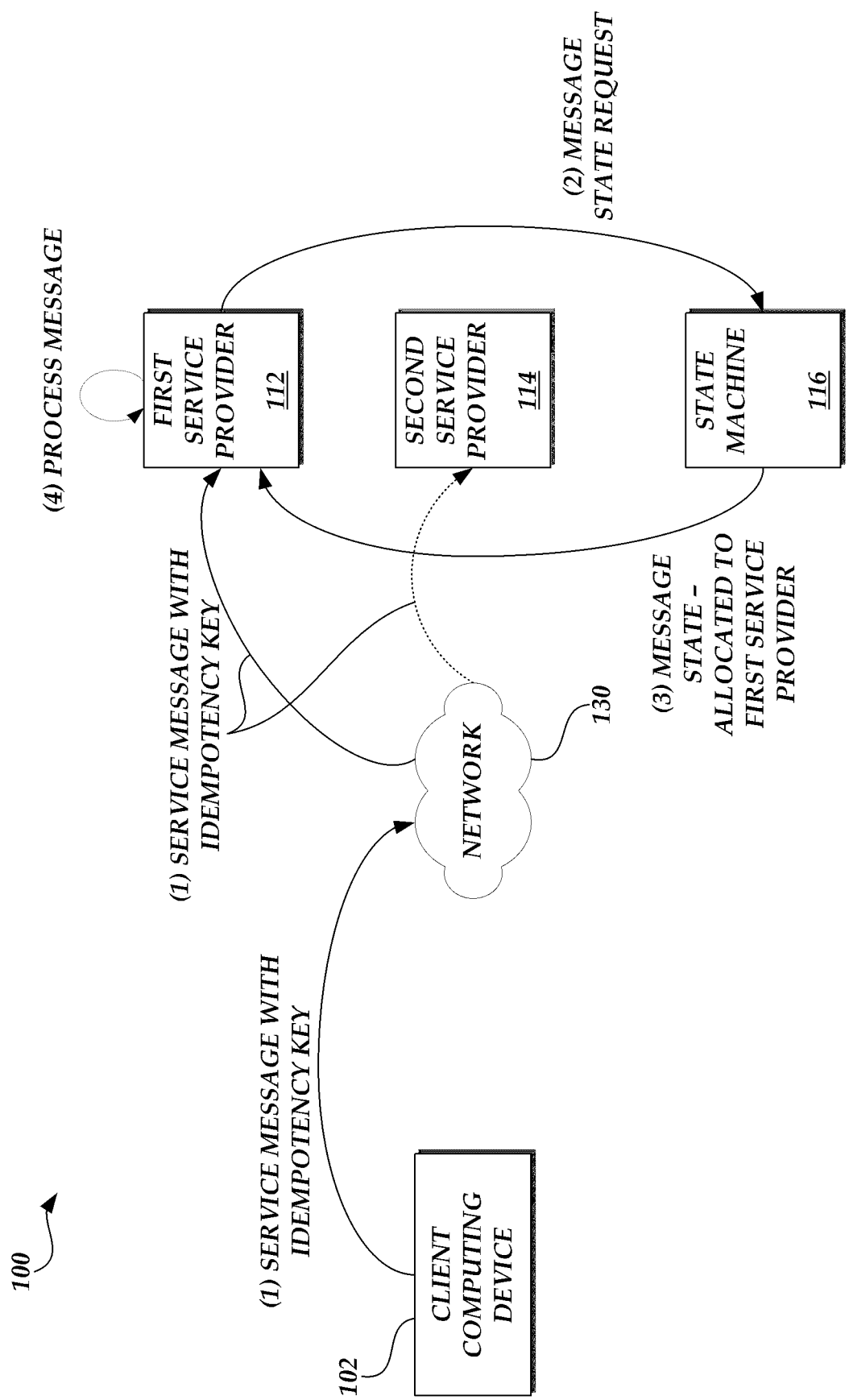
FIG. 5 is a block diagram of the logical network of FIG. 1 illustrating the processing of a previously allocated message by an authoritative network service provider in accordance with the present application.
Figure 6:
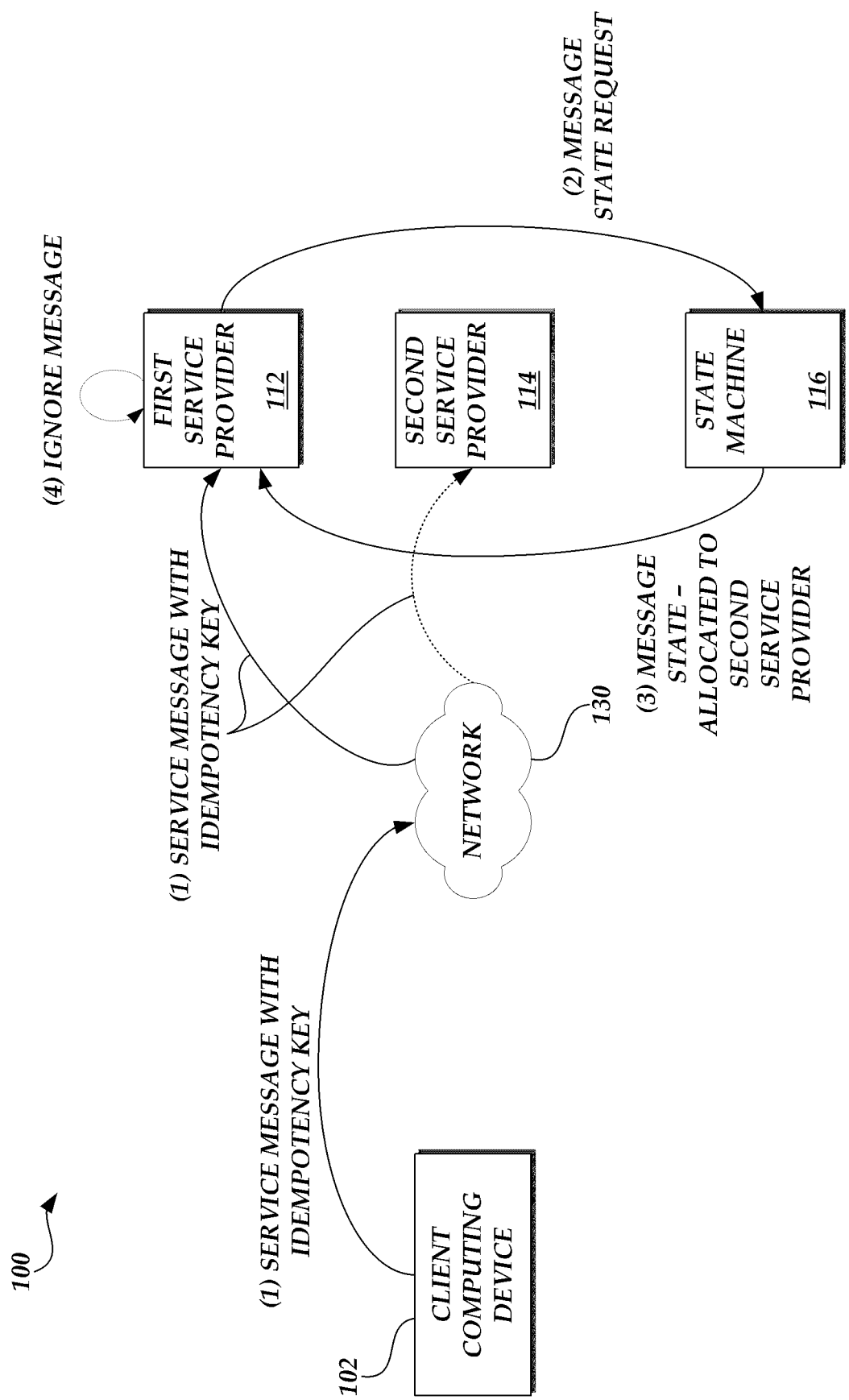
FIG. 6 is a block diagram of the logical network of FIG. 1 illustrating the processing of a previously allocated message by an authoritative network service provider in accordance with the present application.
Figure 7:
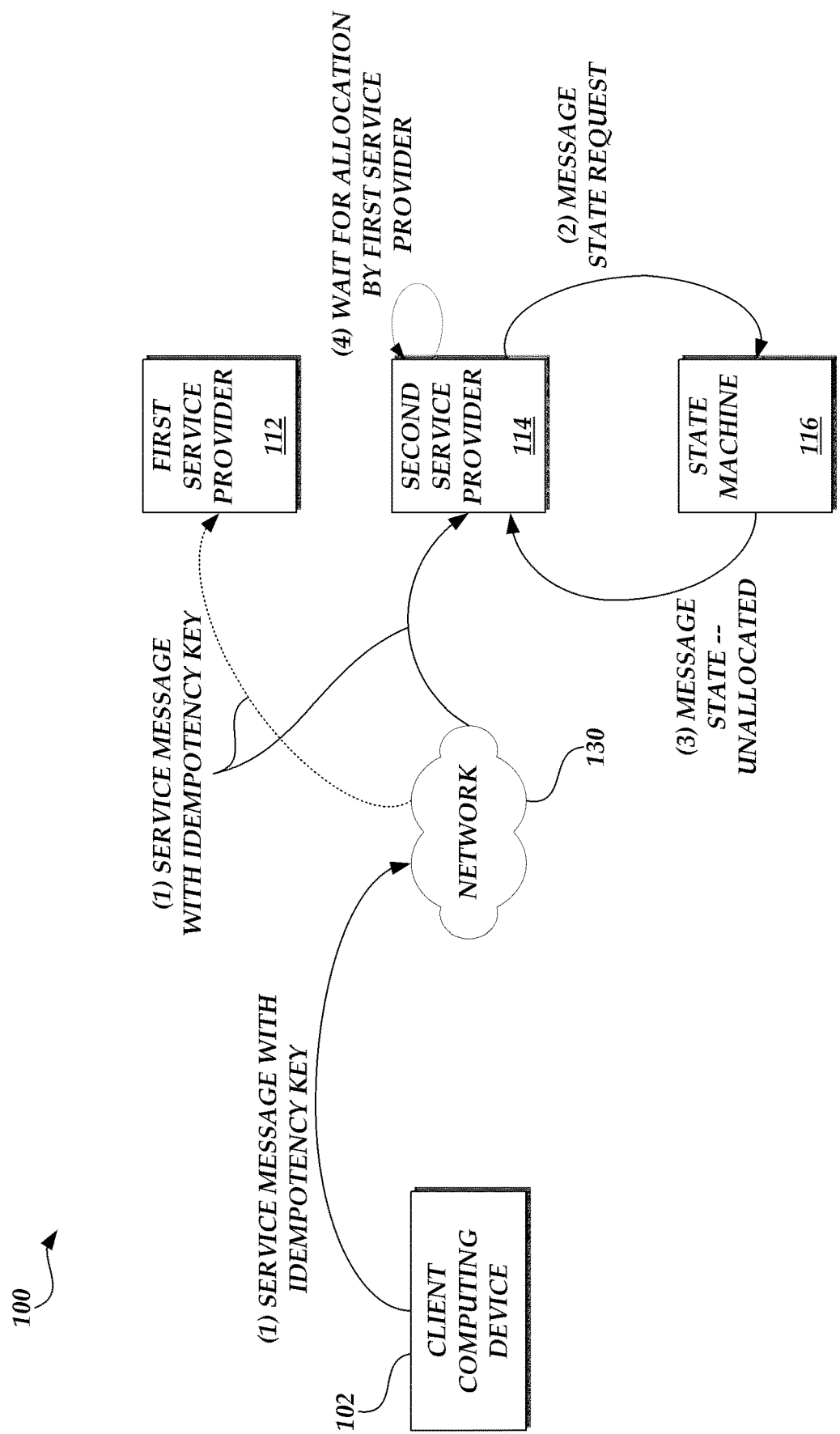
FIG. 7 is a block diagram of the logical network of FIG. 1 illustrating the processing of a previously unallocated message by a non-authoritative network service provider in accordance with the present application.
Figure 8:
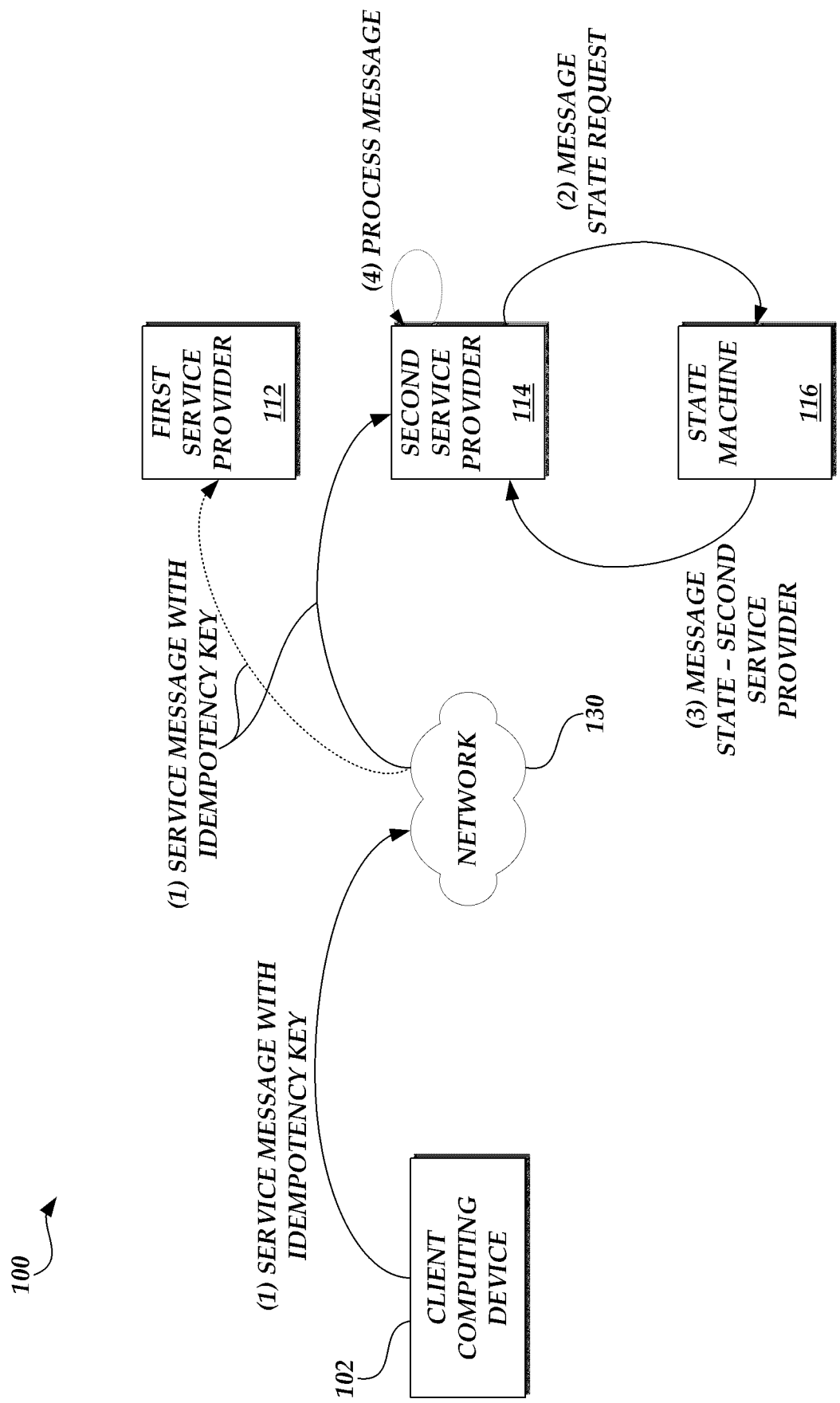
FIG. 8 is a block diagram of the logical network of FIG. 1 illustrating the processing of a previously allocated message by a non-authoritative network service provider in accordance with the present application.
Figure 9:
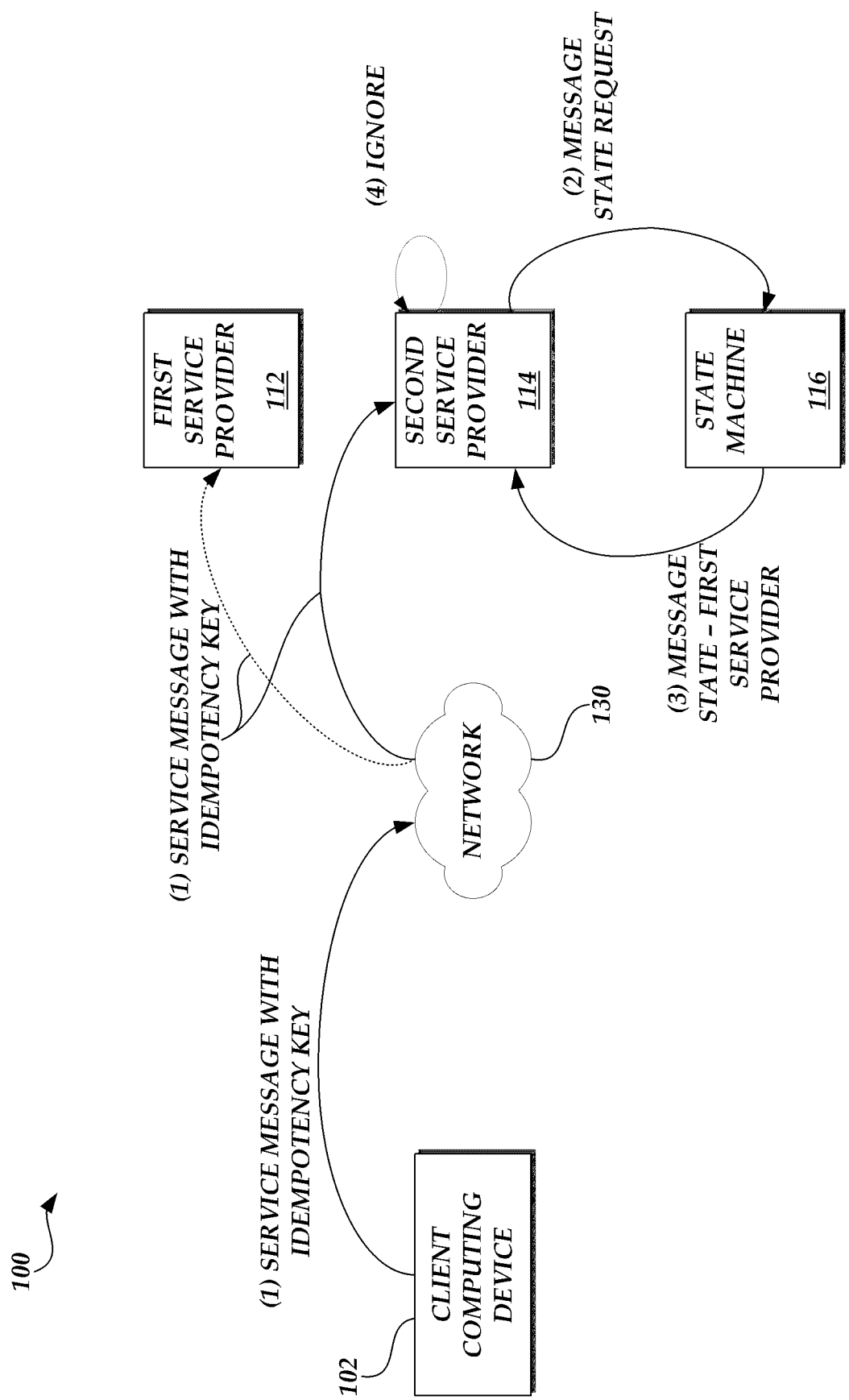
FIG. 9 is a block diagram of the logical network of FIG. 1 illustrating the processing of a previously allocated message by a non-authoritative network service provider in accordance with the present application.

Turning now to FIGS. 4A, 4B, and 5-9, illustrative interactions between the components of the logical network 100 to process messages will be described. In accordance with the illustrations of FIGS. 4A, 4B, and 5-9, the first and second network services 112 and 114 each receive a message that may be processed by either the first network service 112 or the second network service 114. The messages may be received substantially simultaneously or in staggered manner. FIGS. 4A, 4B, 5, and 6 illustrate the processing of the received message with regard to first network service 112. FIGS. 7-9 illustrate the processing of the received message with regard to second network service 114. One skilled in the relevant art will appreciate that the interaction illustrated in FIGS. 4A, 4B, 5, and 6 and FIGS. 7-9 may occur substantially at the same time.

Figure 4A:
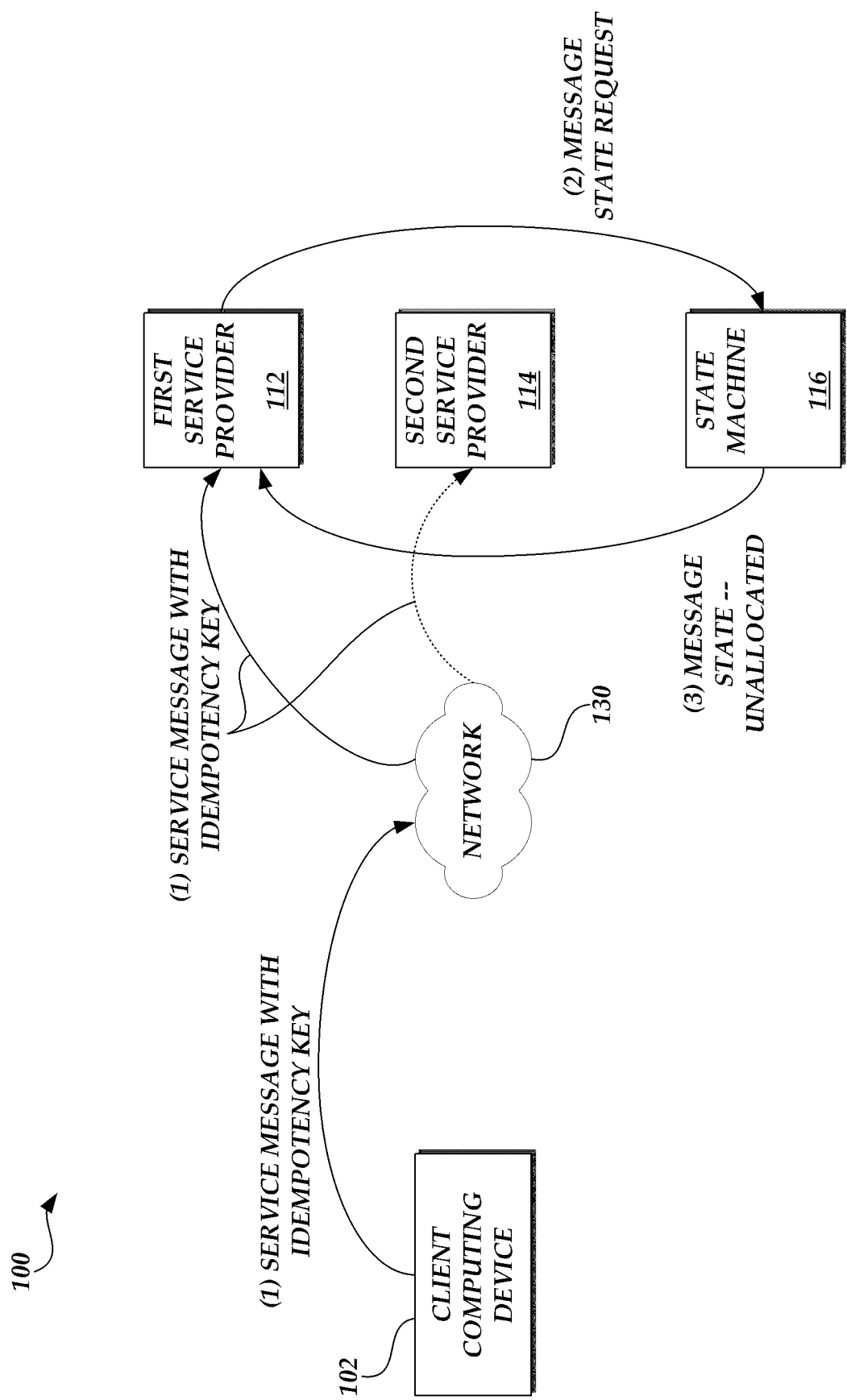
FIGS. 4A and 4B are block diagrams of the logical network of FIG. 1 illustrating the processing of a previously unallocated message by an authoritative network service provider in accordance with the present application.

With reference to FIG. 4A, at (1), the client computing device 102 generates a service message that includes an idempotency key. Illustratively, the idempotency key is a unique identifier, such as 64-bit unique identifier. Additionally, the idempotency key will be utilized by a receiving service provider with the message, such as a command or control, has previously been received by the service provider. Still further, the transmission of the message from the client computing device 102 can be accomplished via any one of a variety of communication protocols. Additionally, for purposes of the illustrative example either the first network service 112 or the second network service 114 are capable of processing the message.

For purposes of illustration, assume that the message is received by the first network service 112, which is has been designated as authoritative. At (2) the first network service 112 transmits a request to that state machine 116 to get a current state of the message. Illustratively, in a two network service provider embodiment, the state of message can be designated as 1) no ownership designation or unassigned; 2) assigned to the authoritative network service provider; or 3) assigned to the second network service provider. One skilled in the relevant art will appreciate that additional states could be incorporated or grouping of states. For purposes of illustration, at (3) the state machine returns the current state as unassigned.

Figure 4B:
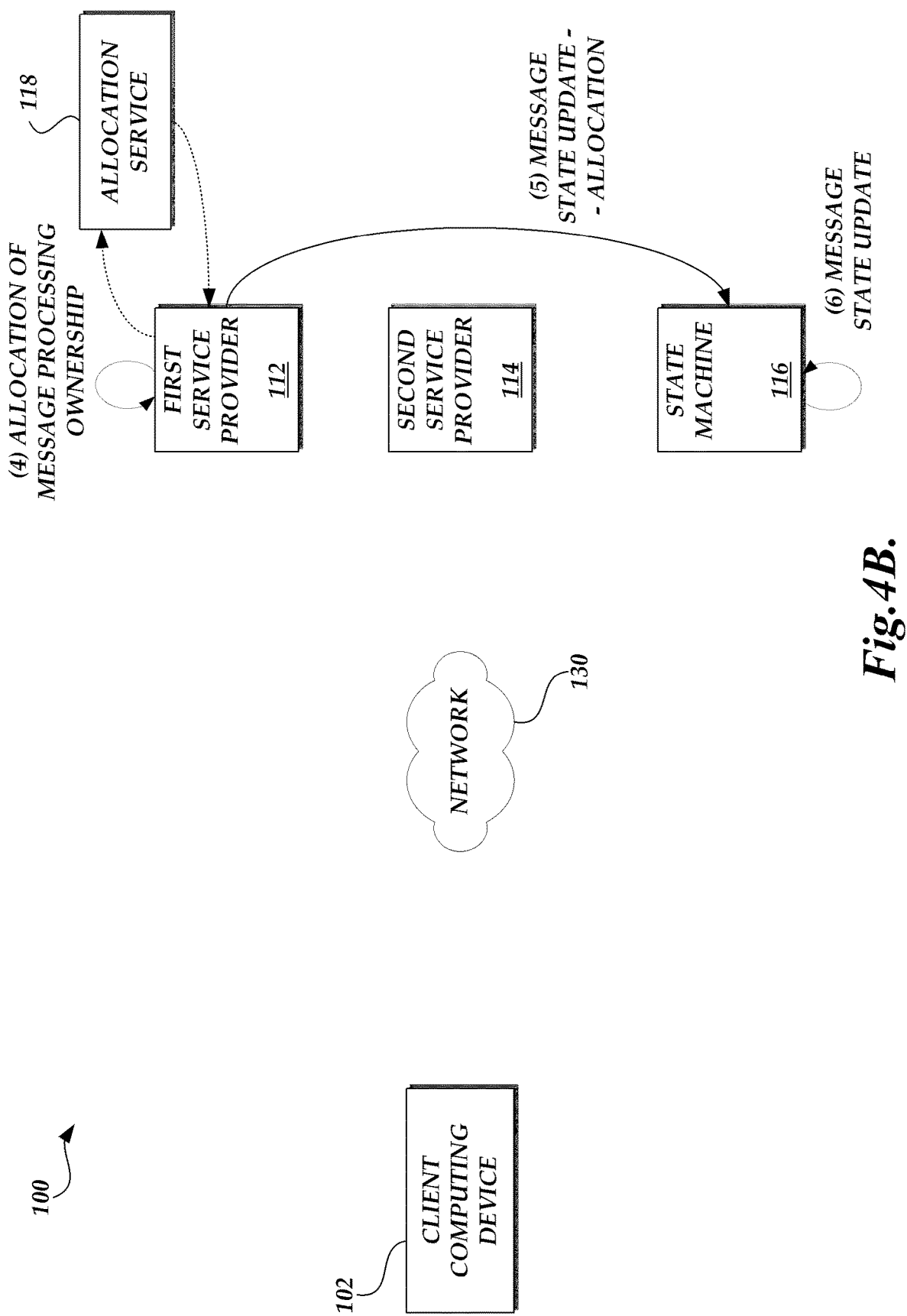

With reference to FIG. 4B, because the state of the message is unallocated and the first network service 112 is authoritative, at (4), the first network service 112 determines an allocation of message processing ownership. Illustratively, the allocation of message processing ownership can be defined in terms of percentage of unassigned messages that are assigned to the first network service 112 or the second network service provider server 114. The allocation can be dynamic in nature, such as for when one of the network service providers is increasing the number of messages being process, such as a ramp up percentage. In such embodiments, the allocation may be set by an administrator or by the first network service 112. For example, the allocation of processing ownership may be based on a planned ramp-up schedule or divestiture. The allocation can be further based on consideration of additional factors, such as a characterization of a type of command/message, load or resource optimization and the like. In some embodiments, the first network service 112 can also obtain at least a portion of the allocation information from the allocation service 118. In these embodiments, the allocation service 118 may provide the allocation information for the particular message. In other examples, the allocation service 1q18 can provide underlying data related to the allocation, such as a current allocation percentage or criteria utilized by the first network service 112 to determine an allocation. Based on the determined allocation, at (5), the first network service 112 transmits an update to the state machine 116, which updates the state appropriately.

With reference to FIG. 5, an embodiment in which the authoritative first network service 112 processes a previously allocated message will be described. At (1), the client computing device 102 generates a service message that includes an idempotency key. Illustratively, the idempotency key is a unique identifier, such as 64-bit unique identifier. Additionally, the idempotency key will be utilized by a receiving service provider with the message, such as a command or control, has previously been received by the service provider. Still further, the transmission of the message from the client computing device 102 can be accomplished via any one of a variety of communication protocols.

At (2) the first network service 112 transmits a request to that state machine 116 to get a current state of the message. For purposes of illustration, at (3) the state machine returns the current state has been previously assigned to the first network service 112. Accordingly, at (4), the first network service 112 processes the message. For illustrative purposes, if the message includes an idempotency key that has been previously included in a message, the first network service 112 can assume that the message/request is duplicative and process accordingly.

With reference to FIG. 6, a second embodiment in which the authoritative first network service 112 processes a previously allocated message will be described. At (1), the client computing device 102 generates a service message that includes an idempotency key. Illustratively, the idempotency key is a unique identifier, such as 64-bit unique identifier. Illustratively, the idempotency key will be utilized by a receiving service provider with the message, such as a command or control, has previously been received by the service provider.

Illustratively, the transmission of the message from the client computing device 102 can be accomplished via any one of a variety of communication protocols.

At (2) the first network service 112 transmits a request to that state machine 116 to get a current state of the message. For purposes of illustration, at (3) the state machine returns the current state has been previously assigned to the second network service provider server 114. Accordingly, at (4), the first network service 112 ignores the message. For illustrative purposes, if the message includes an idempotency key that has been previously included in a message, the first network service 112 will not be able to tell whether that the message/request is duplicative and process accordingly.

Turning to FIG. 7, an embodiment in which the non-authoritative second network service 112 processes the previously unallocated message will be described (as described above in FIGS. 4A and 4B). At (1), the client computing device 102 generates a service message that includes an idempotency key. Illustratively, the idempotency key is a unique identifier, such as 64-bit unique identifier. Illustratively, the idempotency key will be utilized by a receiving service provider with the message, such as a command or control, has previously been received by the service provider. Illustratively, the transmission of the message from the client computing device 102 can be accomplished via any one of a variety of communication protocols.

At (2) the second network service provider server 114 transmits a request to that state machine 116 to get a current state of the message. For purposes of illustration, at (3) the state machine returns the current state has been previously unallocated. In this embodiment, the second network service provider server 114 is non-authoritative and will wait until the authoritative network service 112 allocates processing ownership. As previously described and illustrated in FIGS. 4A and 4B, the second network service provider server 114 is configured with the assumption that the first network service 112 has received the message and is processing the allocation as the designated authoritative server. If the allocation has not yet occurred as expected by the second network service 114, in some embodiments, the client computing devices 102 may transmit duplicate messages if a response is not received. In another embodiment, the second network service provider server 114 second network service provider server 114 or other component can provide some indication that the first network service 112 needs to determination an allocation. In still further embodiments, if a threshold amount of time has occurred or if any requests to receive an allocation are not responsive, the second network service 114 can assume an authoritative role and execute the interactions (or a portion) illustrated in FIGS. 4A or 4B. Accordingly, at (4), the second network service provider server 114 waits for the authoritative designation.

With reference to FIG. 8, an embodiment in which the non-authoritative second network service provider server 114 processes a previously allocated message will be described. At (1), the client computing device 102 generates a service message that includes an idempotency key. Illustratively, the idempotency key is a unique identifier, such as 64-bit unique identifier. Additionally, the idempotency key will be utilized by a receiving service provider with the message, such as a command or control, has previously been received by the service provider. Still further, the transmission of the message from the client computing device 102 can be accomplished via any one of a variety of communication protocols.

At (2) the second network service provider server 114 transmits a request to that state machine 116 to get a current state of the message. For purposes of illustration, at (3) the state machine returns the current state has been previously assigned to the second network service provider server 114.

Accordingly, at (4), the second network service provider server processes the message. For illustrative purposes, if the message includes an idempotency key that has been previously included in a message, the second network service provider server 114 can assume that the message/request is duplicative and process accordingly.

With reference to FIG. 9, a second embodiment in which the non-authoritative second network service provider server 114 processes a previously allocated message will be described. At (1), the client computing device 102 generates a service message that includes an idempotency key. Illustratively, the idempotency key is a unique identifier, such as 64-bit unique identifier. Additionally, the idempotency key will be utilized by a receiving service provider with the message, such as a command or control, has previously been received by the service provider. Still further, the transmission of the message from the client computing device 102 can be accomplished via any one of a variety of communication protocols.

At (2) the second network service provider server 114 transmits a request to that state machine 116 to get a current state of the message. For purposes of illustration, at (3) the state machine returns the current state has been previously assigned to the first network service 112. Accordingly, at (4), the second network service provider server 114 ignores the message. For illustrative purposes, if the message includes an idempotency key that has been previously included in a message, the second network service provider server 114 will not be able to tell whether that the message/request is duplicative and process accordingly.

Figure 10:
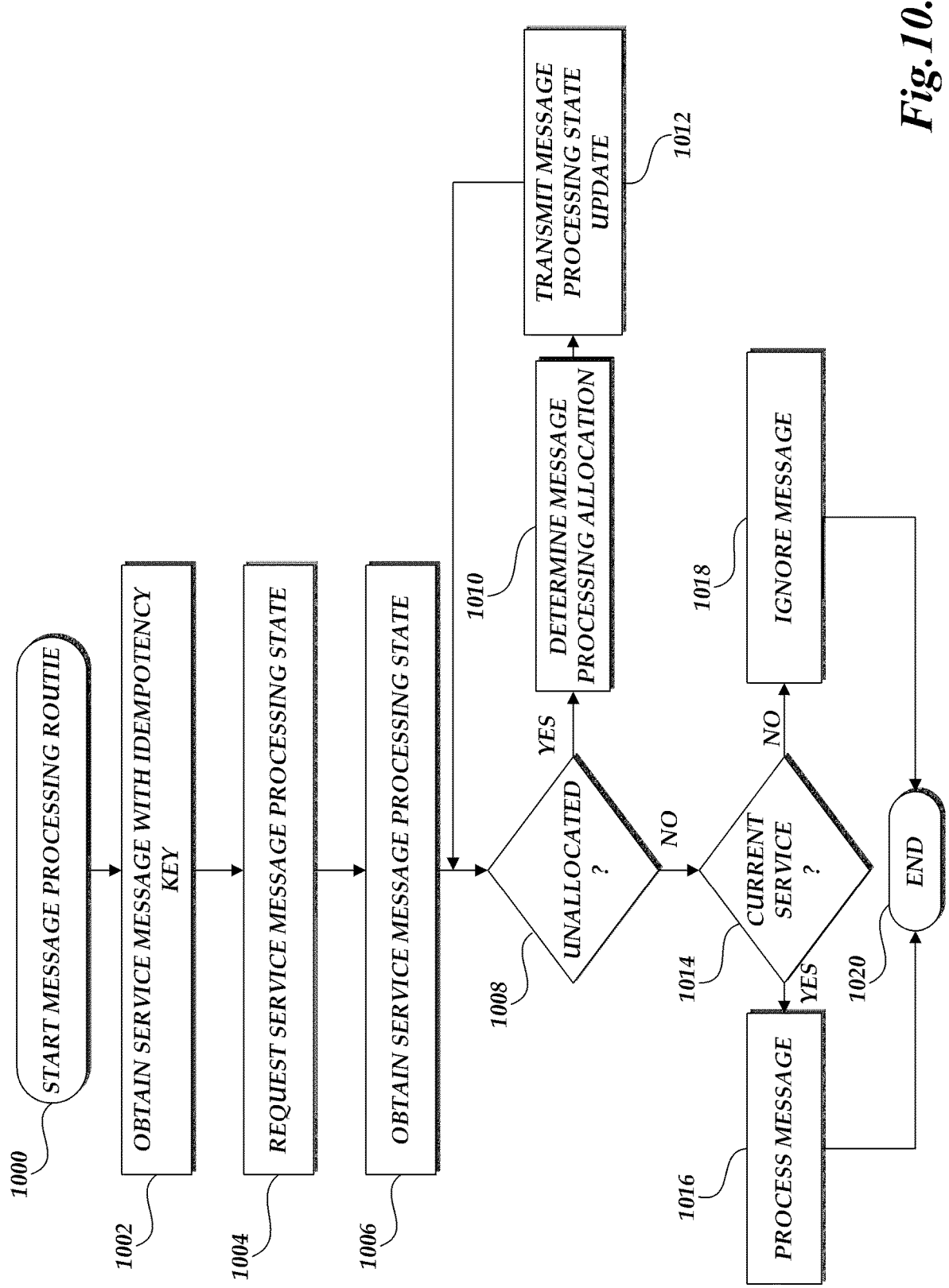
FIG. 10 is a flow diagram illustrative of a message processing routine implemented by an authoritative server in accordance with the present application.

FIG. 10 is a flow diagram illustrative of a message processing routine 1000 implemented by first network service 112 in accordance with the present application. At block 1002, the first network service 112 obtains a service message with an idempotency key. Illustratively, the client computing device 102 generates a service message that includes an idempotency key. Illustratively, the idempotency key is a unique identifier, such as 64-bit unique identifier. Additionally, the idempotency key will be utilized by a receiving service provider with the message, such as a command or control, has previously been received by the service provider. Still further, the transmission of the message from the client computing device 102 can be accomplished via any one of a variety of communication protocols. Additionally, for purposes of the illustrative example both the first network service 112 or the second network service provider server 114 are capable of processing the message and it is assumed both receive the same message for processing.

At block 1004, the first network service 112 transmits a request to that state machine 116 to get a current state of the message. Illustratively, in a two network service provider embodiment, the state of message can be designated as 1) no ownership designation or unassigned; 2) assigned to the authoritative network service provider; or 3) assigned to the second network service provider. One skilled in the relevant art will appreciate that additional states could be incorporated or grouping of states. At block 1006, the first network service 112 obtains a return of the requested state information At decision block 1008, a test is conducted to determine whether the returned state information is indicative of an unallocated processing ownership. If so, at block 1010, the first network service 112 determines an allocation of message processing ownership. As previously discussed, in some embodiments, the determination of message allocation may be offset to the message allocation service 118. Illustratively, the allocation of message processing ownership can be defined in terms of percentage of unassigned messages that are assigned to the first network service 112 or the second network service provider server 114. The allocation can be dynamic in nature, such as for when one of the network service providers is increasing the number of messages being process, such as a ramp up percentage. In such embodiments, the allocation may be set by an administrator or by the first network service 112. For example, the allocation of processing ownership may be based on a planned ramp-up schedule for one of the network service provider or divestiture of messages for a network service provider.

The allocation can be further based on consideration of additional factors, such as a characterization of a type of command/message, load or resource optimization, service level agreements, financial costs attributes, and the like. For example, each of the network service providers may be associated with performance metrics attributed to the processing of messages/commands. Accordingly, the first network service 112 may utilize a cumulative calculate performance metric to determine which network service provider will process individual messages. In another example, each network service provider can be attributed a financial cost that defines the cost incurred by the client computing device 102 or service provider system 110 in processing the message. Accordingly, the first network service 112 may utilize cost metrics related to overall spend (over a period of time) or a per message spend to determine which network service provider will process individual messages. Still further, the first network service 112 may utilize a combination of metrics in other embodiments. Based on the determined allocation, at block 1012, the first network service 112 transmits an update to the state machine 116, which updates the state appropriately. The routine 1000 returns to decision block 1008 to process the updated allocation as described below.

Returning to decision block 1008, if the returned state information is indicative of a previous allocation of a message, at decision block 1014, a test is conducted to determine whether the first network service 112 has been designated as having processing ownership. If so, the first network service 112 can process the message at block 1016. For illustrative purposes, if the message includes an idempotency key that has been previously included in a message, the first network service 112 can assume that the message/request is duplicative and process accordingly. If the previous allocation does not correspond to the first network service 112, at block 1018, the first network service 112 can ignore the message. At block 1020, the routine 1000 terminates.

Figure 11:
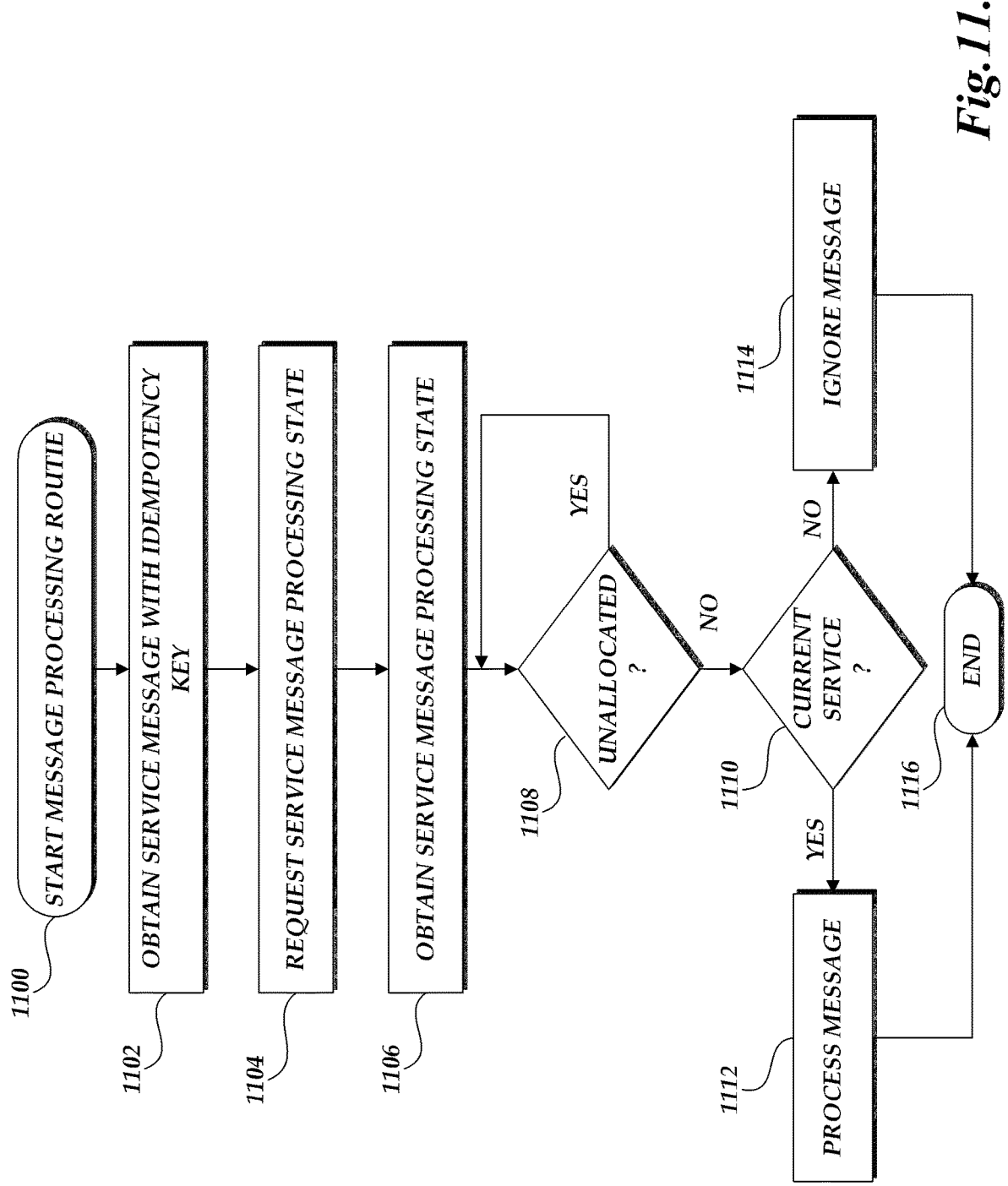
FIG. 11 is a flow diagram illustrative of a message processing routine implemented by a non-authoritative server in accordance with the present application.

Turning now to FIG. 11, a flow diagram illustrative of a message processing routine 1100 implemented by the second network service provider server 114 in accordance with the present application will be described. At block 1102, the second network service provider server 114 obtains a service message with an idempotency key. Illustratively, the client computing device 102 generates a service message that includes an idempotency key. Additionally, the idempotency key is a unique identifier, such as 64-bit unique identifier. Still further, the idempotency key will be utilized by a receiving service provider with the message, such as a command or control, has previously been received by the service provider. Illustratively, the transmission of the message from the client computing device 102 can be accomplished via any one of a variety of communication protocols. Additionally, for purposes of the illustrative example either the first network service 112 or the second network service provider server 114 are capable of processing the message.

At block 1104, the second network service provider server 114 transmits a request to that state machine 116 to get a current state of the message. Illustratively, in a two network service provider embodiment, the state of message can be designated as 1) no ownership designation or unassigned; 2) assigned to the authoritative network service provider; or 3) assigned to the second network service provider. One skilled in the relevant art will appreciate that additional states could be incorporated or grouping of states. At block 1106, the second network service provider server 114 obtains a return of the requested state information At decision block 1108, a test is conducted to determine whether the returned state information is indicative of an unallocated processing ownership. If so, second network service provider server 114 does not determine an allocation of message processing ownership. Rather, the routine 1100 will return to decision block 1008 to await a designation or allocation by the first network service 112. As previously described, it is assumed that an authoritative server (e.g., the first network service 112) has also received the message and will be making an allocation decision for any message not having an allocation. As previously described, however, in some embodiments, the second network service 114 may transmit additional communications to the firs network service 112 to prompt for a determination of allocation. Additionally, in some embodiments, based upon criteria, the second network service 114 may assume responsibility for the allocation if the first network service 112 is unresponsive, unavailable or if multiple unsuccessful attempts have been made to determine an allocation.

If, however, at decision block 1108, the returned state information is indicative of a previous allocation of a message, at decision block 111, a test is conducted to determine whether the second network service provider server 114 has been designated as having processing ownership. If so, the second network service provider server 114 can process the message at block 1112. For illustrative purposes, if the message includes an idempotency key that has been previously included in a message, the second network service provider server 114 can assume that the message/request is duplicative and process accordingly. For illustrative purposes, if the message includes an idempotency key that has been previously included in a message, the second network service provider server 114 can assume that the message/request is duplicative and process accordingly. If the previous allocation does not correspond to the second network service provider server 114, at block second network service provider server 1114, the second network service provider server 114 can ignore the message. At block 1116, the routine 1100 terminates.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing commands by a plurality of network services comprising:

a plurality of client devices, wherein individual client devices transmit service commands to individual network services from the plurality of network services and wherein each of the service commands are associated with an idempotency key;

one or more computing devices, having a processor and a memory that execute computer-readable instructions for implementing a messaging manager that maintains state information for the service commands transmitted to the plurality of network services, wherein the state information is defined as one of unclaimed, processing by a first network service, or processing by a second network service;

one or more first computing devices, having a processor and a memory, the one or more first computing devices associated with the first network service for receiving and processing the service commands transmitted by the plurality of client devices, wherein the one of more first computing devices associated with the first network service:

establishes a service command allocation wherein the service command allocation is based on a planned ramp-up schedule of processing of the service commands by the first network service to processing of the service commands by the second network service, receives the service commands from the individual client devices, in response to determining that the state information for the received service commands is defined as unclaimed, modifies the state information for the received service commands to either processing by the first network service or processing by the second network service according to the established service command allocation; and one or more second computing devices, having a processor and a memory, the one or more second computing devices associated with the second network service for receiving and processing service commands transmitted by the plurality of client devices, wherein the one or more second computing devices associated with the second network service are restricted from processing unclaimed service commands and further wherein the one or more second computing devices associated with the second network service:

receives the service commands from the individual client devices, and in response to determining that the state information for the received service commands is defined as unclaimed, determines to not process the received service commands.

2. The system as recited in claim 1, wherein the one or more first computing devices and the one or more second computing devices do not process any previously processed service command.

3. The system as recited in claim 1, wherein the service command allocation is further based on a percentage of overall service commands received.

4. The system as recited in claim 3, wherein the service command allocation is dynamically adjusted.

5. The system as recited in claim 1 further comprising:

one or more third computing devices, having a processor and a memory, the one or more third computing devices associated with a third network service for receiving and processing the service commands transmitted by the plurality of client devices, wherein the one or more third computing devices are restricted from processing unclaimed service commands and further wherein the state information is defined as one of unclaimed, processing by the first network service, processing by the second network service, or processing by the third network service.

6. The system as recited in claim 5, wherein the one or more first computing devices:

receives the service commands from the individual client services, and in response to determining that the state information for the received service commands is unclaimed, modifies the state information for the received service command to processing by the first network service, processing by the second network service or processing by the third network service according to the established service command allocation.

7. A method for managing network communication processing between a plurality of services comprising at least an authoritative service and a plurality of non-authoritative services, wherein a client device transmits a service message to each of the plurality of services and wherein the service message is associated with an idempotency key associated with the client device, comprising:

obtaining, by a non-authoritative service of the plurality of non-authoritative services, the service message from the client device, wherein the non-authoritative service is restricted from processing unassigned service messages;

determining to not process, by the non-authoritative service, the service message upon determining that the service message is unassigned to any of the plurality of non-authoritative services;

obtaining, by the authoritative service implemented on a computing system, the service message from the client device, wherein the authoritative service implemented on the computing system is configured to process service messages that are unassigned to any of the plurality of non-authoritative services;

in response to determining, that the service message has been unassigned to any of the plurality of non-authoritative services, allocating, by the authoritative service implemented on the computing system, processing of the service message, according to a service allocation, to the non-authoritative service, wherein the service allocation is based on a planned ramp-up schedule of processing of the service messages by the authoritative service to processing of the service messages by the non-authoritative service; and causing, by the authoritative service implemented on the computing system, state information associated with the service message to be updated with an allocation of processing.

8. The method as recited in claim 7, wherein determining that the service message has been unassigned to any of the plurality of non-authoritative services corresponds to obtaining state information indicative of an unassigned state.

9. The method as recited in claim 7, wherein allocating the processing of the service message, according to the service allocation, to the non-authoritative service includes obtaining allocation information.

10. The method as recited in claim 7, wherein the service allocation is associated with a percentage allocation among the plurality of services.

11. The method as recited in claim 10 further comprising dynamically modifying the service allocation.

12. The method as recited in claim 7 further comprising:

obtaining, by the non-authoritative service, a duplicate transmittal of the service message from the client device;

determining, by the non-authoritative service, that the service message has been assigned to the non-authoritative service for processing; and processing the service message.

13. The method as recited in claim 7 further comprising:

obtaining, by the_non-authoritative service, a duplicate transmittal of the service message from the client device;

determining, by the non-authoritative service, that a separate non-authoritative service of the plurality of non-authoritative services has been previously allocated processing of the service message; and determining to not process the service message.

14. The method as recited in claim 7, wherein the authoritative service can cause modification of the state information and the plurality of non-authoritative services cannot cause modification of the state information.

15. A method for managing network communication processing between a plurality of services implemented on computing devices, wherein the plurality of services comprise at least an authoritative service and a plurality of non-authoritative services, wherein a client device transmits a service message to each of the plurality of services, and wherein the service message is associated with an idempotency key unique the client device, comprising:

obtaining, by a non-authoritative service of the plurality of non-authoritative services, the service message from the client device, wherein the non-authoritative service is restricted from processing unassigned service messages;

determining to not process, by the non-authoritative service, the service message upon determining that the service message is unassigned to any of the plurality of non-authoritative services;

obtaining, by the authoritative service, the service message from the client device, wherein the authoritative service is configured to process unassigned service messages;

responsive to determining that the service message has been unassigned to any of the plurality of non-authoritative services, allocating, by the authoritative service, processing of the service message, according to a service allocation, to the non-authoritative service, wherein the service allocation is based on a planned ramp-up schedule of processing of the service messages by the authoritative service to processing of the service messages by one of the plurality of non-authoritative services;

responsive to obtaining a duplicate transmittal of the service message, determining, by the non-authoritative service, that the authoritative service has allocated processing of the service message;

obtaining, by the non-authoritative service, state information associated with the service message updated with the allocation of processing; and processing, by the non-authoritative service, the duplicate transmittal of the service message according to the state information.

16. The method as recited in claim 15, wherein the state information associated with the service message includes an unassigned state and wherein determining, that the service message has been unassigned to any of the plurality of non-authoritative services corresponds to obtaining state information indicative of the unassigned state.

17. The method as recited in claim 15, wherein the state information associated with the service message includes information indicative that the non-authoritative service has been allocated processing of the service message and wherein processing the duplicate transmittal of the service message according to the state information includes processing the service message.

18. The method as recited in claim 15, wherein the state information associated with the service message includes information indicative that a different non-authoritative service of the plurality of non-authoritative services has been allocated processing of the service message and wherein processing the duplicate transmittal of the service message according to the state information includes determining to not process a command contained in the service message.

19. The method as recited in claim 15, wherein the plurality of the non-authoritative services cannot cause modification of the state information.

* * * * *